United States Patent
Lhuillier et al.

(10) Patent No.: US 8,262,171 B2
(45) Date of Patent: Sep. 11, 2012

(54) POWER-ASSIST BRAKE SYSTEM EQUIPPED WITH ADHESIVE JOINT AND METHOD FOR MOUNTING SAME

(75) Inventors: Laurent Lhuillier, Le Blanc Mesnil (FR); Alain Benoit, Vaujours (FR)

(73) Assignee: Robert Bosch GmbH, Stuttgart (DE)

( * ) Notice: Subject to any disclaimer, the term of this patent is extended or adjusted under 35 U.S.C. 154(b) by 1022 days.

(21) Appl. No.: 12/161,248

(22) PCT Filed: Feb. 21, 2007

(86) PCT No.: PCT/EP2007/051682
§ 371 (c)(1),
(2), (4) Date: Jul. 17, 2008

(87) PCT Pub. No.: WO2007/096391
PCT Pub. Date: Aug. 30, 2007

(65) Prior Publication Data
US 2010/0219591 A1    Sep. 2, 2010

(30) Foreign Application Priority Data

Feb. 27, 2006 (FR) .................... 06 01847

(51) Int. Cl.
*B60T 17/00* (2006.01)
(52) U.S. Cl. ............ 303/1; 277/598; 277/630; 277/652; 277/917
(58) Field of Classification Search ............... 303/114.1, 303/1, 4; 188/356, 358; 91/376 R; 277/598, 277/630, 637, 641, 652, 654, 917, 316; 29/525.01
See application file for complete search history.

(56) References Cited

U.S. PATENT DOCUMENTS

| 4,475,337 | A | * | 10/1984 | Meynier ..................... 60/547.1 |
| 4,567,728 | A | * | 2/1986 | Ohmi et al. .................. 60/547.1 |
| 4,586,580 | A | * | 5/1986 | Spielmann et al. .......... 180/89.1 |
| 4,592,438 | A | * | 6/1986 | Spielmann et al. .......... 180/89.1 |
| 4,658,660 | A | * | 4/1987 | Parker ........................... 74/102 |
| 4,932,275 | A | * | 6/1990 | Bischoff et al. ............... 74/18.2 |
| 5,011,234 | A | * | 4/1991 | Bischoff et al. ................. 303/4 |

(Continued)

FOREIGN PATENT DOCUMENTS

DE    3428868 A1    2/1986

(Continued)

OTHER PUBLICATIONS

PCT/EP2007/051682 International Search Report.

*Primary Examiner* — Robert A Siconolfi
*Assistant Examiner* — Mariano Sy
(74) *Attorney, Agent, or Firm* — Michael Best & Friedrich LLP

(57) ABSTRACT

In order to allow a single operator on a vehicle assembly line to attach a brake servo to a bulkhead by moving round from the engine compartment side to the passenger compartment side, a brake servo is fitted with an adhesive and insulating seal (14). This seal has two adhesive faces and each of the two adhesive faces has a protective film provided with a tab (15, 16); each protective film is of a distinctive color. One of the two protective films has cuts (17) along holes (10) in the seal, these cuts being intended to make it easier for the protective film to be removed as the brake servo is mounted against the bulkhead.

20 Claims, 2 Drawing Sheets

U.S. PATENT DOCUMENTS

| | | | |
|---|---|---|---|
| 5,784,946 A * | 7/1998 | Malosh et al. | 91/376 R |
| 6,481,330 B1 * | 11/2002 | Jakobi et al. | 91/376 R |
| 6,907,731 B2 * | 6/2005 | Ogura et al. | 60/547.1 |
| 7,040,217 B1 * | 5/2006 | Wake | 92/169.2 |
| 2004/0134295 A1 * | 7/2004 | Vermoesen et al. | 74/18.2 |
| 2004/0144090 A1 * | 7/2004 | Ogura et al. | 60/547.1 |
| 2006/0117747 A1 | 6/2006 | Braun | |

FOREIGN PATENT DOCUMENTS

| | | |
|---|---|---|
| DE | 10041711 A1 * | 3/2002 |
| FR | 2711749 A1 | 5/1995 |
| GB | 2085989 A | 5/1982 |

* cited by examiner

POWER-ASSIST BRAKE SYSTEM EQUIPPED WITH ADHESIVE JOINT AND METHOD FOR MOUNTING SAME

BACKGROUND AND SUMMARY OF THE INVENTION

The subject of the present invention is a brake servo positioned against a bulkhead (dash panel) of a vehicle. Another subject of the invention is a method of mounting this brake servo against a bulkhead. The object of the invention is to make such a brake servo located in the engine compartment of a vehicle easier to mount and to connect to a brake pedal via a pedal box control located on the other side of the bulkhead, inside the passenger compartment of the vehicle.

The field of application of the invention is that of the seals found on a bulkhead when a vehicle is being assembled on a production line. These seals are needed whenever a cable or a moving part such as a rod or a lever is passed through an aperture in the bulkhead, from the engine compartment to the passenger compartment of the vehicle, in order to seal said aperture.

It is therefore necessary, in order to ensure the comfort and safety of the user of the vehicle, for the division created by the bulkhead between the engine compartment and the passenger compartment to be insulated as well as possible. It is therefore necessary to avoid any gap in the vicinity of an aperture or where a component passes through the bulkhead.

Thus, the seal positioned against the bulkhead, usually on the engine compartment side, is designed to eliminate these gaps. It avoids drafts inside the passenger compartment but also prevents any leaking engine exhaust gas or any emissions from any oil that has dropped onto the engine block, from distracting or even intoxicating the driver of the vehicle with toxic vapors.

This seal also makes it possible, when the vehicle is driving through a heavy storm or when the vehicle is being washed with a pressure washer, to guarantee that the passenger compartment will remain dry and free of moisture.

This seal also provides good acoustic insulation, insulating the passenger compartment from engine noise or vibration transmitted through the bulkhead.

More specifically, the seal that forms the subject of the invention is the one that provides sealing between a brake servo located on the engine compartment side and a pedal box control system located on the passenger compartment side. In the prior art, this seal follows the outline of the brake servo and, through holes, provides the openings needed for moving parts and for the studs used to attach and clamp the brake servo to the bulkhead. The brake servo is usually fitted with this seal. That being the case, there are two possible scenarios.

In the first scenario, two operators are needed on the assembly line, one on the engine compartment side to offer up the brake servo fitted with its seal and the other on the passenger compartment side to attach the brake servo and to offer up the pedal box control system. Attachment is performed, for example, using screws on the passenger compartment side screwed onto studs secured to the brake servo and passing through the bulkhead.

The need for two operators in order to perform this single operation on the vehicle assembly line gives rise to problems associated with cost and coordination.

In a second scenario, the single operator has to move around to the other side of the bulkhead in order to find, in the passenger compartment, those parts of the brake servo that will allow it to be attached correctly on the passenger compartment side. This presents problems because there is a high risk that the brake servo or at the very least its correct positioning facing the aperture in the bulkhead will be lost while the operator is moving around to the other side of the bulkhead. Now, having the brake servo positioned only approximately on the bulkhead can not only make it more difficult to connect it to the pedal box control system in the passenger compartment, but can also lead to gaps at the junction with the bulkhead, these gaps being detrimental to the sealing of the engine compartment with respect to the passenger compartment.

There are currently a small number of solutions in existence which will allow a single operator to connect the brake servo to the control pedal box from the engine compartment side and securely attach the whole thing to the bulkhead. However, the mounting method most commonly used is the one that involves assembling and securely attaching the servo brake and pedal box control from the passenger compartment side.

The problem is to successfully mount a brake servo with a seal that will allow a single operator to attach the brake servo correctly to the pedal box control in the passenger compartment in the knowledge that the brake servo will still be offered up to the bulkhead from the engine compartment side.

In the solution of the invention, the brake servo has the special feature of having an adhesive seal with a protective film for each face. Because the two faces of the seal are similar, the color of the protective films differentiates the face intended to be stuck to the brake servo from the one intended to be stuck to the bulkhead.

The brake servo fitted with its seal is offered up by the operator on the assembly line. Just before pressing it against the bulkhead, the operator removes the protective film from the second adhesive face of the seal which will thus stick to the bulkhead.

In the solution of the invention, the protective film is designed to be removed quickly in a single movement consistent with the throughput of the assembly line without the seal tearing and without the slightest scrap of protective film remaining on the face that is to be offered up to the bulkhead. In addition, the adhesion between the seal and the bulkhead is intended to support the weight of a brake servo weighing around 2 to 3 kilograms. Thus, the operator has the opportunity and the time needed to move around from the engine compartment side to the passenger compartment side without the help of a colleague and without running the risk of losing the brake servo or its alignment facing the aperture in the bulkhead.

The solution also makes it possible to maintain the correct tightening torque used to tighten the screws onto the attachment studs of the brake servo while at the same time achieving correct acoustic, thermal and mechanical sealing of the seal.

The subject of the invention is therefore a brake servo to be attached against a bulkhead in an engine compartment and screwed from the passenger compartment side of a vehicle, characterized in that the face thereof that faces toward the bulkhead has an adhesive seal.

BRIEF DESCRIPTION OF THE DRAWINGS

The invention will be better understood from reading the description which follows and from examining the accompanying figures. These are given solely by way of entirely non-limiting indication of the invention. The figures show.

DETAILED DESCRIPTION

Figure 1:
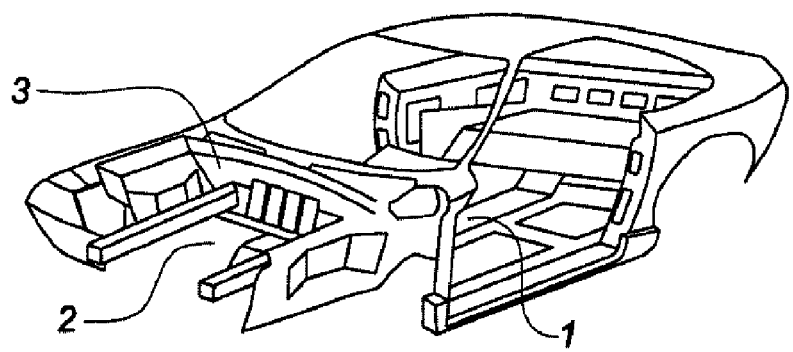
FIG. 1: a depiction of a vehicle with its engine compartment, its passenger compartment and its bulkhead.

FIG. 1 shows a vehicle such as it might appear in the assembly phase on an assembly line. There are three regions that differ from one another: the passenger compartment 1 determining the interior structure of the vehicle, the engine compartment 2 housing the engine and the main dynamic functions of the vehicle, and, between these two, the bulkhead 3.

The bulkhead 3 is in the form of a sheet metal partition inclined toward the passenger compartment. It begins at the base of the engine block support and is angled gradually as far as the base of the vehicle windscreen (windshield).

Figure 2:
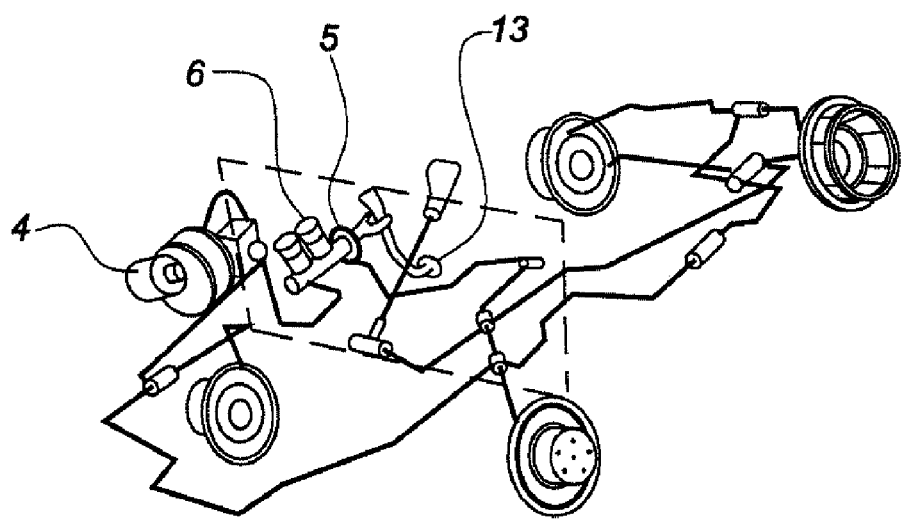
FIG. 2: an exploded view of the vehicle with its brake servo and its pedal box control.
Figure 3:
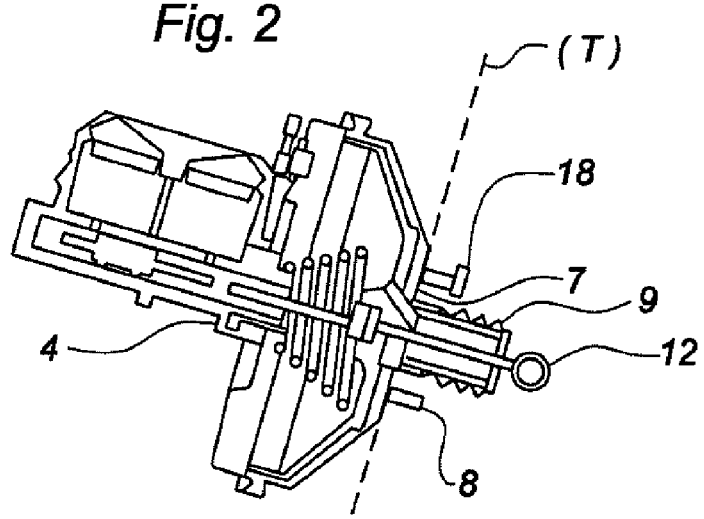
FIG. 3: a depiction of a brake servo of the prior art, inclined in the plane of the bulkhead.

FIG. 2 denotes the main devices involved in the invention. It shows the brake servo 4 on the engine compartment 2 side and the pedal box control 5 on the passenger compartment 1 side, here shown with a master cylinder 6. FIG. 3 depicts a brake servo 4 with its bearing surface 7 for resting against the bulkhead 3 and the inclined plane (T) that corresponds to the surface of the bulkhead 3. The attachment studs 8 secured to the brake servo are located on the same side as the surface that bears against the bulkhead 3; the brake servo control rod 9 is centered on this face and the studs are around the periphery. The control rod 9 and the studs 8 pass through several holes 10 and 11 in both the bulkhead and the seal, in this instance a hole 11 for the control rod 9 and, in general, four far smaller holes 10 for the four studs 8. The pin 12 for its part is used to attach the control rod 9 to the brake pedal 13. It is against the bearing surface 7 of the brake servo 4 that the seal 14 is initially stuck before this entity is pressed onto and attached to the bulkhead 3 during vehicle assembly.

Figure 4:
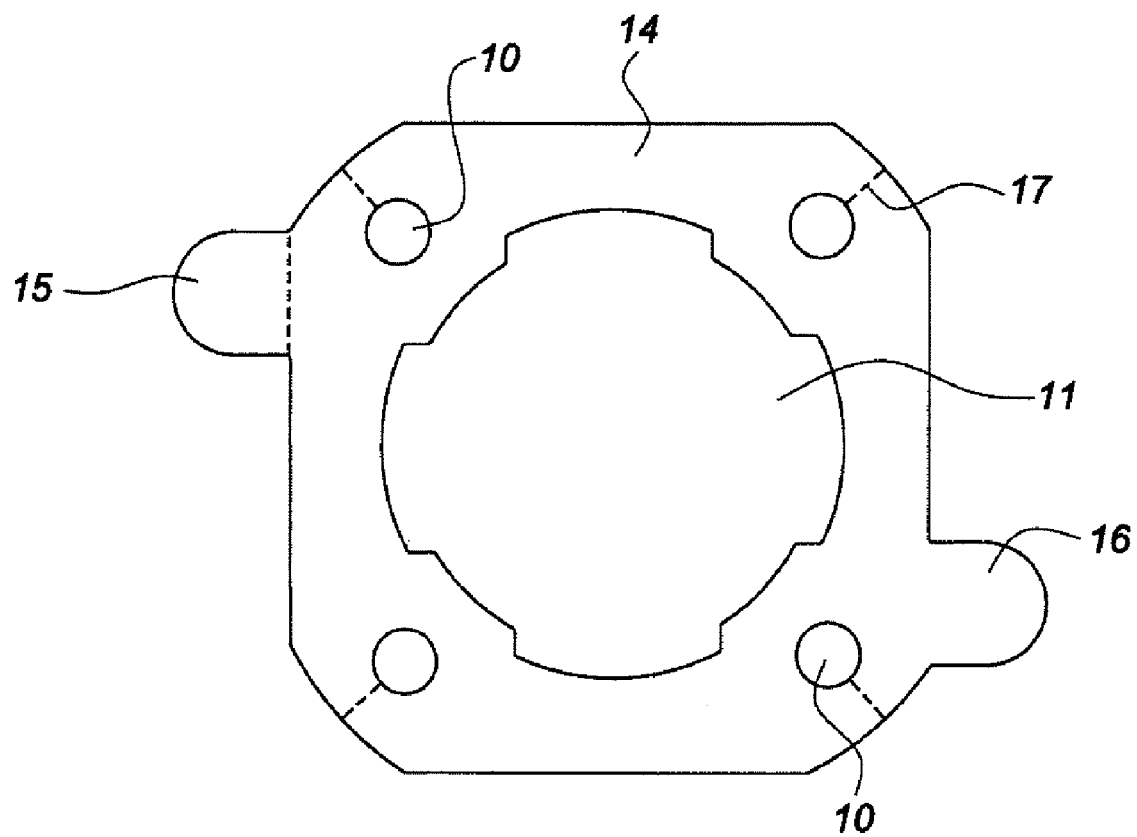
FIG. 4: the brake servo seal of the invention.

FIG. 4 depicts the seal 14 of the brake servo of the invention. In the middle of the seal 14 there is an almost-circular hole 11 through which the control rod 9 of the brake servo 4 can pass and holes 10 for the passage of the fixing studs 8 located, in this example, at each corner. The tabs 15 and 16 each correspond to a pull tab for each protective film for each adhesive face of the seal 14. A protective film is a film which covers the entire face of the seal 14 and has exactly the same cuts at the same locations which means that, in practice, the raw material and the film are cut out together from the same block. Before the adhesive seal is combined with the brake servo, each face can be identified by its protective film, in this instance, a darker color and a thicker less flexible film of the slightly plasticized kraft paper type is used for one face and a finer and more elastic white film is used for the other face but different patterns may, for example, be envisioned. This first protective film can be removed taking no special precautions because it does not encounter any obstacles and its job is merely to protect the adhesive face of the seal that is intended to be stuck to the brake servo of the invention. The second protective film is more flexible or even more elastic so that it tears less readily while it is being removed. In addition, it has cuts 17, preferably straight ones, extending from the outer edges of each of the holes 10 corresponding to the studs 8 for attaching the brake servo 4 as far as the outer edge of the seal 14 itself, in a direction, which at the middle of the seal preferably corresponds to a diametrical direction. These cuts 17 allow the operator on the assembly line to remove the film quickly in spite of the presence of the studs 8. Specifically, when the operator pulls this tab 16 near a cut 17, the film opens up at the cut 17 allowing the first stud 8, followed by the second, and so on up to the last stud, to pass. Nonetheless, the film is strong enough that it does not break and that it can be removed in a single piece slipping it over the control rod 9.

When the cuts 17 are being created in the protective film, the cutting tool, for example a press cutter, used for the operation, may also, with that impetus, begin to, or even completely, cut the material of the seal 14 itself. The consequences of this at this point are minimal because the seal 14 remains firmly stuck to the bulkhead 3 and the cuts 17 are located at points that communicate only with the small stud holes 10; no connection between the outer edge of the seal and its inner edge represented by the central hole 11 for the brake servo 4 control rod 9 is established.

The material used for the seal is based on a polyurethane foam, by way of indication, with a density of about 100 kg per cubic meter and with a thickness of around 1 millimeter. This type of material, which is rot-proof, and at once flexible in this thickness and rigid in the plane of its surface, allows the face 7 via which the brake servo 4 bears against the bulkhead 3 itself to be insulated. Metal-to-metal contact is thus avoided as is any potential unwanted vibrational noise. This thickness of around 1 millimeter is consistent with the material of the seal 14 and makes it possible to keep the seal 14 flexible and elastically damping in its thickness but rigid on its flat surface. This rigidity makes it easier to slip the seal 14 over the studs 8 and the control rod 9 to apply it to the brake servo 4. As a result, when grasped by a corner by the operator, a simple translational movement allows the seal to be laid nicely parallel to the surface of the brake servo and then stuck thereto.

This thickness of around 1 millimeter above all provides security in the tightening of the nuts 18 onto the studs from the passenger compartment side; this is because a seal 14 of greater thickness would introduce too much elasticity and play into the tightening of these nuts 18. With this additional thickness, the nuts 18, once tightened at the same time enough to hold the brake servo 4 in place but without thereby compressing the seal 14 too greatly and causing it to lose its insulating nature, would ultimately gradually slacken off.

With regard to the cutting of the holes 10 via which the studs pass through the seal 14, the solution dictates that the diameter of these holes 10 be approximately five tenths of a millimeter larger than the diameter of the studs 8. If the difference in diameter is any greater than that, the surface of the brake servo will be in direct contact with the bulkhead, once again leading to metal-to-metal contact and all the attendant noises and vibrational stresses. With a difference in diameter any smaller than that there is a risk that the seal material will become torn through contact with the studs 8.

The adhesive used on each of the surfaces of the seals 14, whether a glue derivative or a seccotine derivative, must above all not adversely affect the physical qualities of the seal itself and must be capable of bearing the weight of the brake servo 4 for at least long enough for it to be permanently attached by the operator. The angle by which the bulkhead 3 is oriented toward the passenger compartment 1 helps in this as the servo can rest on the slope offered by the bulkhead 3 which means that the tear strength of the adhesive of the seal 14 has to support only part of the weight of the brake servo 4.

Another subject of the invention is a method of mounting the brake servo 4 with its adhesive seal 14. When the vehicle is being assembled on the production line, the operator, once he has the brake servo 4 in his hand, then removes the protective film from the adhesive face of the seal using its pull tab 16. The tab 16 makes this operation easier because the operator often has to wear lightweight protective woolen gloves, which gloves make this type of operation harder. At this stage in the mounting operation each of the cuts 17 is able to open up a hole for each stud 8 in the pulling-off of the protective film, the central hole 11 in the seal allowing the seal 14 to fit over the control rod 9 mechanism without the need of a cut 17 to allow the control rod through. In a similar action, the operator presses the brake servo 4, via its adhesive face, against the holes in the bulkhead that correspond to the control rod 9 and to the studs 8, from the engine compartment 2 side, and the brake servo 4 is then held against the bulkhead 3 by itself, merely by the adhesive strength of the seal 14. The operator then moves around the vehicle to the passenger compartment side and takes hold of and then screws the screws 18 that attach to the studs of the brake servo 4 until he feels the seal 14 pull up gently against the bulkhead 3. In the same movement he attaches the control rod 9 using the pin 12 of the brake servo 4 to the pedal box control 5.

In an alternative form of embodiment the seal is fixed to the bulkhead.

The invention claimed is:

1. A brake servo (4) to be fixed in an engine compartment (2) against a bulkhead (3) and screw-fastened from a passenger compartment (1) side of a vehicle, comprising an adhesive seal (14), characterized in that the seal (14) has a protective film with tabs (15) and (16) corresponding to each adhesive face of the seal (14), and in that the protective film to be stuck to the bulkhead is precut (17) along lines leading from stud holes to an outer edge of the seal (14).

2. The brake servo according to claim 1, characterized in that the seal has two adhesive faces, one on a brake servo side and the other on a bulkhead side, the two adhesive faces being capable alone of supporting the brake servo while the brake servo is being fixed to the bulkhead.

3. The brake servo according to claim 2, characterized in that the adhesive face of the seal is able to develop an adhesive force, this adhesive force being designed to last for long enough for the brake servo to be permanently attached to the bulkhead from the passenger compartment side using mechanical means.

4. The brake servo according to claim 3, characterized in that each protective film is of at least one of a different color and a different material.

5. The brake servo according to claim 4, characterized in that the shape and cut in the seal follow an outline of the brake servo and outlines of the studs (8) used to attach the brake servo.

6. The brake servo according to claim 5, characterized in that a material of the seal is flexible and elastic in the direction of a thickness of the seal.

7. The brake servo according to claim 6, characterized in that the material of which the seal is made includes a substance for absorbing thermal, acoustic and mechanical stresses.

8. The brake servo according to claim 1, characterized in that the adhesive face of the seal is able to develop an adhesive force, this adhesive force being designed to last for long enough for the brake servo to be permanently attached to the bulkhead from the passenger compartment side using mechanical means.

9. The brake servo according to claim 1, characterized in that each protective film is of at least one of a different color and a different material.

10. The brake servo according to claim 1, characterized in that the shape and cut in the seal follow an outline of the brake servo and outlines of the studs (8) used to attach the brake servo.

11. The brake servo according to claim 1, characterized in that a material of the seal is flexible and elastic in the direction of a thickness of the seal.

12. The brake servo according to claim 1, characterized in that a material of which the seal is made includes a substance for absorbing thermal, acoustic and mechanical stresses.

13. A method of mounting a brake servo on a bulkhead from an engine compartment side of a vehicle, characterized in that the method comprises the following steps:
 applying an adhesive seal to the brake servo on a face of the brake servo that includes a pedal box control rod (9),
 applying the brake servo fitted with the adhesive seal from the engine compartment side against an aperture (11) in the bulkhead that corresponds to a hole through which the control rod associated with a control pedal box passes,
 supporting, with the adhesive seal, the brake servo on the bulkhead, and
 tightening nuts (18) that attach to studs (8) of the brake servo from the passenger compartment side.

14. The mounting method according to claim 13, characterized in that the seal has two adhesive faces, one on a brake servo side and the other on a bulkhead side, and the two adhesive faces alone support the brake servo while the brake servo is being fixed to the bulkhead.

15. The mounting method according to claim 13, characterized in that applying an adhesive seal includes applying an adhesive seal having an adhesive face able to develop an adhesive force, this adhesive force being designed to last for long enough for the brake servo to be permanently attached to the bulkhead from the passenger compartment side using mechanical means.

16. The mounting method according to claim 13, characterized in that applying an adhesive seal includes applying an adhesive seal formed of a material flexible and elastic in the direction of a thickness of the seal.

17. The mounting method according to claim 13, characterized in that applying an adhesive seal includes applying an adhesive seal formed of a material including a substance for absorbing thermal, acoustic and mechanical stresses.

18. The mounting method according to claim 13, characterized in that the method further comprises removing a first protective film of the seal from one face of the seal using a pull tab (15),
 sticking the seal to a face of the brake servo fitted with attachment studs and to be mounted against the bulkhead,
 removing a second protective film of the seal comprising cuts (17) using a pull tab (16).

19. The mounting method according to claim 18, characterized in that applying an adhesive seal includes applying an adhesive seal with each protective film of at least one of a different color and a different material.

20. The mounting method according to claim 18, characterized in that applying an adhesive seal includes applying an adhesive seal with a shape and cut in the seal following an outline of the brake servo and outlines of the studs (8) used to attach the brake servo.

\* \* \* \* \*